(12) United States Patent
Poertzgen (10) Patent No.: US 8,186,488 B2
(45) Date of Patent: May 29, 2012

(54) REDUCED-NOISE ELECTRIC BRAKE ACTUATOR

(75) Inventor: Gregor Poertzgen, Koblenz (DE)

(73) Assignee: Lucas Automotive GmbH (DE)

( * ) Notice: Subject to any disclaimer, the term of this patent is extended or adjusted under 35 U.S.C. 154(b) by 738 days.

(21) Appl. No.: 12/224,115

(22) PCT Filed: Feb. 16, 2007

(86) PCT No.: PCT/EP2007/001372
§ 371 (c)(1), (2), (4) Date: Aug. 18, 2008

(87) PCT Pub. No.: WO2007/096098
PCT Pub. Date: Aug. 30, 2007

(65) Prior Publication Data
US 2009/0050420 A1    Feb. 26, 2009

(30) Foreign Application Priority Data
Feb. 20, 2006  (DE) .......................... 10 2006 007 755

(51) Int. Cl.
*B60L 7/00* (2006.01)
(52) U.S. Cl. ........................................................ 188/162
(58) Field of Classification Search ................. 188/162, 188/72.1, 72.3, 158, 156
See application file for complete search history.

(56) References Cited

U.S. PATENT DOCUMENTS

| | | | |
|---|---|---|---|
| 3,463,950 A | | 8/1969 | Schädlich |
| 3,667,317 A | * | 6/1972 | Hillingrathner ................. 74/604 |
| 6,179,097 B1 | * | 1/2001 | Schumann .................... 188/162 |
| 6,394,235 B1 | | 5/2002 | Poertzgen et al. |
| 2003/0089576 A1 | | 5/2003 | Peter |
| 2004/0178028 A1 | | 9/2004 | Farmer et al. |

FOREIGN PATENT DOCUMENTS

| | | |
|---|---|---|
| DE | 197 32 168 C1 | 1/1999 |
| DE | 102 46 711 A1 | 4/2004 |
| DE | 103 15 117 A1 | 10/2004 |
| DE | 10 2005 021 767 A1 | 9/2006 |
| WO | WO 2004/044445 A2 | 5/2004 |

* cited by examiner

*Primary Examiner* — Melanie Torres Williams
(74) *Attorney, Agent, or Firm* — MacMillan, Sobanski & Todd, LLC (57) ABSTRACT

An electric brake actuator is described. The actuator comprises a housing, an electric motor, a device for torque transmission and an element for torque delivery. The device for torque transmission is a gear mechanism with a gear shaft which is parallel to the motor shaft, wherein the torque is transmitted from the electric motor to the gear mechanism by means of a belt drive. The distance between the motor shaft and the gear shaft is fixed by means of a rigid spacer, the opposite ends of which are located on different sides of the plane which is defined by a belt of the belt drive.

14 Claims, 6 Drawing Sheets

REDUCED-NOISE ELECTRIC BRAKE ACTUATOR

CROSS-REFERENCE TO RELATED APPLICATIONS

This application is a National Stage of International Application No. PCT/EP2007/001372 filed Feb. 16, 2007, the disclosures of which are incorporated herein by reference in entirety, and which claimed priority to German Patent Application No. 10 2006 007 755.5 filed Feb. 20, 2006, the disclosures of which are incorporated herein by reference in entirety.

BACKGROUND OF THE INVENTION

The invention relates to the field of brakes and in particular of motor vehicle brakes. To be more precise, the invention relates to a brake actuator which can be actuated by an electric motor.

Brake actuators which can be actuated by an electric motor are used both for service brakes and for hand brakes (also called parking brakes) of motor vehicles. The advantage of this design with respect to brakes which are actuated solely by means of cables or hydraulics is the fact that the driver does not have to apply a high muscular force in order to actuate the brake. An electrically actuated brake can also be effectively combined with modern vehicle electronics. Both the application and the release of the brake can therefore be made dependent on other recorded events or measured values. For example, the brake can be released in an automated manner for a "hill start", so that the driver does not have to operate the brake in addition to the interplay of the accelerator and the clutch. If the vehicle has an automatic gearbox, actuation of the accelerator pedal can suffice to start on a hill without causing the vehicle to roll in the wrong direction and without operating the drive motor at an unfavourable operating point.

Several of the known proposals integrate the brake actuator with the caliper and the friction linings directly at the vehicle wheel. If appropriately designed, vehicle brakes equipped in this way can form, for example, autonomous systems which are also reliable in operation without communication with a central control unit.

In order to attain the power required for brake actuation in electrically operated brake actuators, the torque of an electric motor is as a rule reduced via one or a plurality of gear stage(s). The respective gear stage types can in this case vary, with spur, worm, planetary, rolling body or belt gear mechanisms being usual. The latter have proved to be particularly successful in motor vehicle construction, as, in contrast to most other types of gear, they have good noise-damping properties and are therefore capable of effectively isolating the structure-borne noise produced by the electric motor from the rest of the drive train.

It has become apparent that, in spite of the good noise-damping properties of belt gear mechanisms, the expected noise damping of the entire brake actuator is often not achieved, as in some cases other components of the actuator transmit the vibrations produced by the electric motor around the belt unit. Solutions which permit complete isolation of the structure-borne noise caused by the electric motor from a subsequent drive train are expensive to manufacture and assemble, are often susceptible to faults on account of the high number of parts used and, moreover, may impair the precision in the torque transmission of the entire gear assembly.

BRIEF SUMMARY OF THE INVENTION

The feature of the invention is therefore to present a brake actuator which prevents the described disadvantages.

According to a first aspect of the invention, an electrically driven brake actuator is provided which comprises an electric motor for producing a torque, a device for torque transmission and an element for torque delivery, wherein the electric motor has a motor shaft and the device for torque transmission has a gear mechanism with a gear shaft which is parallel to the motor shaft, wherein the torque is transmitted from the electric motor to the gear mechanism by means of a belt drive and the distance between the motor shaft and the gear shaft is fixed by means of a rigid spacer. Here opposite ends of the spacer are located on different sides of the plane which is defined by a belt of the belt drive. In other words, the spacer extends, for example, in the shape of an S or a Z through the belt plane in order thereby to achieve improved fixing.

The brake actuator can comprise an actuator housing, and at least one component of the actuator, such as, for example, the spacer, can be supported at the actuator housing by means of a vibration-damping element.

The device for torque transmission can include a belt gear mechanism with a belt and at least two pulleys. Alternative gear designs are likewise conceivable, e.g. spur gear mechanisms or worm gear mechanisms, the latter being advantageous with regard to their service life and the construction space.

The belt gear mechanism and in particular the belt can guarantee isolation of the electric motor, in terms of vibrations, from the subsequent actuator components and therefore vibration damping. The belt can be made of a resilient material in order to assist the vibration damping.

According to a first variant, the belt can be a toothless belt. According to a second variant, the belt is formed as a toothed belt. In the case of the second variant the toothed belt and the pulleys can have a pitch, corresponding to one another, of less than 2.5 mm and in particular of less than 1.5 mm. The impact on entry is reduced and the tendency to vibrations decreases as the pitch decreases. The toothed belt and the pulleys can be helically toothed, whereby the tendency to vibrations decreases further and a more uniform torque transmission between the belt and the pulley is obtained.

In the case of a belt gear mechanism the shafts of associated pulleys can also be fixed relative to one another by means of the rigid spacer via the corresponding shafts of the motor and of the gear mechanism. In other words, the spacer can be used to establish and to maintain the distance of the pulleys from one another. The spacer is preferably an independent component. However the spacer can also be integrated into an actuator housing.

At least one of the two pulleys can have a vibration-damping element which transmits torque and is coaxial with its axis of rotation. According to one design possibility, the pulley concerned has a hub of a rigid material with an element of a vibration-damping material which is disposed in a torque-tight manner around the hub and can be in direct contact with the drive belt. In an alternative design the vibration-damping element is located between the hub and a ring gear. The ring gear and the hub can be made of a resistant and optionally hard material. A sintered metal for the hub and a hard-component plastics material for the ring gear have proved to be a successful material choice.

As compared with the hub and/or with the ring gear, the vibration-damping element expediently consists of a softer material, preferably an at least slightly resilient material with high inherent damping. The vibration-damping element is preferably of a constant thickness, related to the extent of the pulley shaft; however a non-uniform thickness may also be a possibility in some cases. The vibration-damping element is usually formed so that it is at a constant average distance from the axis of rotation. The element can be formed along a circular line or any desired curve. In order to influence the torque transmission and vibration damping characteristic of the pulley, the radial extent of the vibration-damping element can vary. Uniform curved projections, for example, have proved successful in practice.

The belt gear mechanism or another element can transmit the torque produced by the electric motor to a downstream gear mechanism, preferably a planetary gear mechanism. This planetary gear mechanism can be of single- or multi-stage design. In the case of a multi-stage design it is advisable to dispose the different stages coaxially. Each stage of the planetary gear mechanism can have a sun wheel, a number of planet wheels and, if necessary, an internal gear. In the case of a multi-stage design of the gear mechanism, successive internal gears can be integrated in a single component.

The torque which is transmitted to the planet wheels can be delivered from the shafts of the latter by means of a planet carrier which can be mounted so as to be rotatable coaxially with the sun wheel. The planet carrier can have one or a plurality of component(s) (e.g. pins or ribs) fixed to the carrier, via which the torque of this carrier can be transmitted to a further gear component fitted coaxially therewith and rotatably mounted. This further gear component is expediently provided on the side of the planet wheels which faces the gear output. For smooth operation it is advisable for the components which are fixed to the carrier to be designed so as to be radially symmetrical or regular along a circular line which is coaxial with the axis of rotation of the carrier. The component or components which is or are fixed to the carrier expediently engage in corresponding recesses of the further gear component. These recesses can be lined with a vibration-damping material.

According to a second aspect of the invention, an electrically driven brake actuator is provided which comprises an actuator housing, an electric motor for producing a torque, a device for torque transmission and an element for torque delivery, wherein at least one component of the actuator is supported at the actuator housing by means of a vibration-damping element and/or wherein the torque is transmitted from the electric motor to the element for torque delivery by means of a vibration-damping element.

The material and the design of the actuator housing can be selected in order to obtain further noise damping. For example, diecast aluminium or injection-moulded plastics material can be used. The housing can in addition be covered on one or both side(s) entirely or partly with a layer of a vibration-damping material. Different parts of the actuator housing may optionally consist of different materials and/or designs.

The brake actuator can include a gear mechanism, in particular a planetary gear mechanism. An internal gear of the planetary gear mechanism can be supported at the actuator housing with one or a plurality of element(s) of a vibration-damping material. If a plurality of such elements are used, a uniform distribution along the circumference of the internal gear is preferred. In the case of a single component of a vibration damping material, this can completely comprise the internal gear or cover just a part of the internal gear.

The torque-producing electric motor can be supported at the actuator housing by at least one element of a vibration-damping material. According to a first design possibility, an element of this kind can be in alignment with the motor shaft at the end of the electric motor at which no torque is delivered. According to a further design possibility, one or a plurality of element(s) of vibration-damping material can be disposed around the electric motor in the circumferential direction. The above-mentioned design possibilities can in addition also be combined.

As already mentioned, a rigid spacer is provided to fix the distance between the motor shaft of the electric motor and a gear shaft which is at least approximately parallel to the motor shaft. The spacer is expediently supported at the actuator housing by means of at least one vibration-damping element. According to a first variant, the spacer and the at least one vibration-damping element by means of which the spacer is supported at the actuator housing are two separate components. This approach enables, for example, the at least one vibration-damping element to be firstly fastened in the region of the actuator housing before the spacer is mounted. According to a second variant, the spacer and the at least one vibration-damping element are connected together (e.g. by means of a two-component connection) and therefore form a spacer component which can be handled separately.

According to one variant, one or a plurality of the vibration-damping elements can consist of an elastomer. Other materials and in particular the use of different vibration-damping materials for the different elements are likewise conceivable.

The electric motor can have a number of poles of more than 5 to assist low-vibration operation. The number of poles can also be 7 in particular. The electric motor can also have a finely balanced armature. A glued flux sheet and/or damped brushes are also possible. A further reduction of noise can be achieved by using a brushless electric motor and/or a reduced-torque electric motor. Furthermore, the electric motor can be operated in a speed range which leads to reduced operating noise, for example by means of an electronic control system.

The electrically driven brake actuator can be part of a brake system, for example of a vehicle brake system. The brake actuator can in this connection be associated with either the hand brake or the service brake. The brake actuator can also be associated with the hand brake and with the service brake at the same time.

Other advantages of this invention will become apparent to those skilled in the art from the following detailed description of the preferred embodiments, when read in light of the accompanying drawings.

DETAILED DESCRIPTION OF THE INVENTION

An embodiment of a brake actuator which can be actuated by an electric motor is described in the following. The described brake actuator delivers a torque which can be used to actuate a vehicle brake (not represented).

Figure 1:
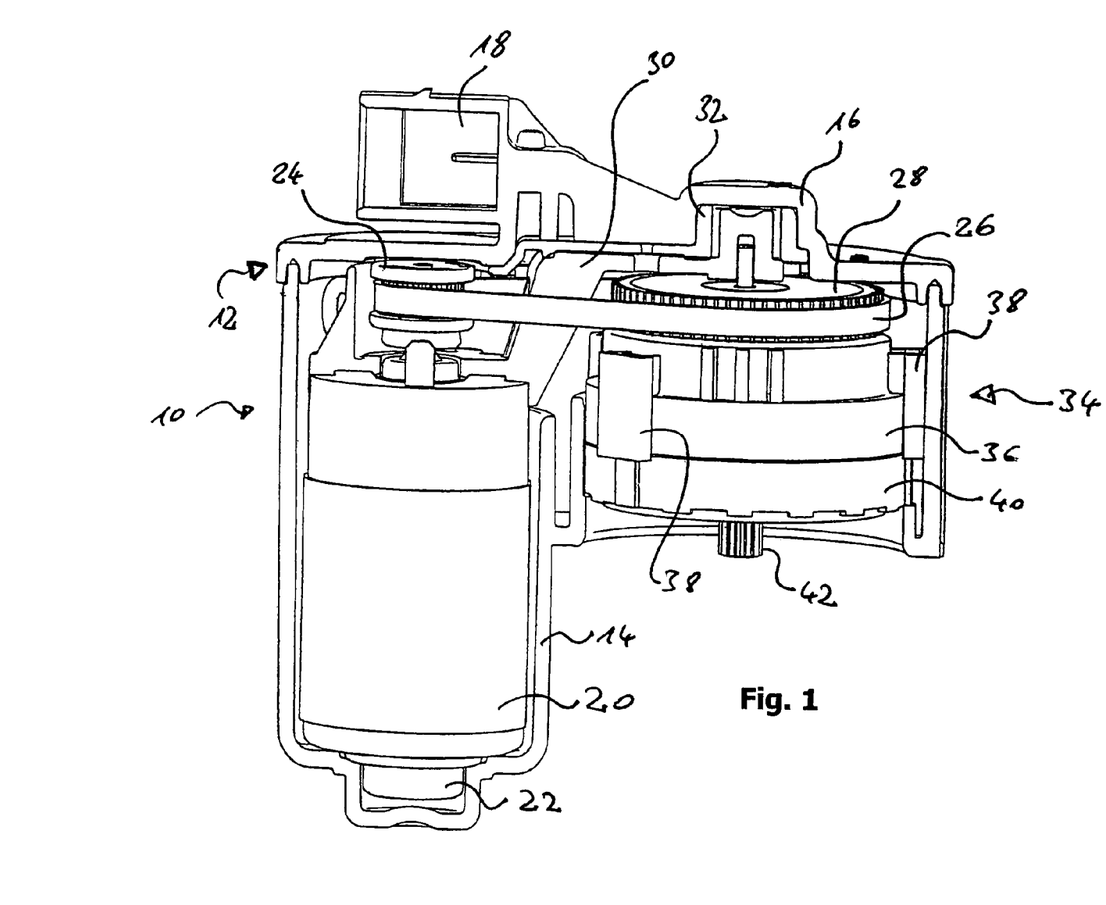
FIG. 1 shows an embodiment of a brake actuator according to the invention in a sectional view.

FIG. 1 shows a partial section through a brake actuator 10 with an actuator housing 12 consisting of a housing body 14 and a housing cover 16. The housing cover 16 includes a connection socket 18 and is seated on the edge of the housing body which is at the top in FIG. 1. The connection socket 18 is electrically connected to the connections of an electric motor 20.

The electric motor 20 is held with a precise fit in a recess of the housing body 14 and is supported at its bottom end at the bottom of the housing body 14 by means of an element 22 of vibration-damping material. The electric motor 20 bears a first toothed belt pulley 24 on its side which faces the housing cover. This first toothed belt pulley is connected to a shaft of the electric motor 20 in a torque-tight manner.

A toothed belt 26 transmits the torque which is transmitted to it from the first toothed belt pulley 24 to a second toothed belt pulley 28. The toothed belt pulley 24 and 28 as well as the toothed belt 26 have a helical tooth system of approximately 2° and a pitch of 2 mm. The first toothed belt pulley 24 bears 22 teeth and the second toothed belt pulley 28 bears 69 teeth. The transmission ratio of the belt gear mechanism is therefore approximately 3.13:1.

A rigid spacer 30 is non-positively connected at its end which is on the left in FIG. 1 to the top end of the body of the electric motor 20. The right-hand end of the spacer 30 forms a holder for a shaft 32 bearing the second toothed belt pulley 28. The two ends of the spacer 30 lie on opposite sides of the plane which is defined by the toothed belt 26. This is facilitated by the approximate S shape of the spacer. The centre part of the spacer 30 passes through a free space which extends between the two toothed belt pulleys 24 and 28. The spacer 30 is supported at its top side with respect to the housing cover 16 in a vibration-absorbing manner by means of an element 32 which is made of a vibration-damping material such as, for example, an elastomer.

A two-stage planetary gear mechanism 34 is driven via the toothed belt pulley 28. An internal gear 36 of the planetary gear mechanism 34 bears on its inside in this design two different tooth systems for the two gear stages. The internal gear 36 is supported against the housing body 14 via the three elements 38 of a resilient, vibration-damping material. A bottom closure ring 40 safeguards the internal gear parts, not visible in this representation, of the planetary gear mechanism 34 against falling out of the internal gear 36. A pin 42 forms the torque output of the actuator and is intended to actuate one or a plurality of brake shoe(s) via further articulated parts. On its outside it can have a profile which facilitates torque transmission. In the selected design this is a "male" Torx profile with which the pin 42 engages in a torque-tight manner in a mechanism which finally actuates the brake shoes. This mechanism can comprise a spindle gear mechanism.

Figure 2:
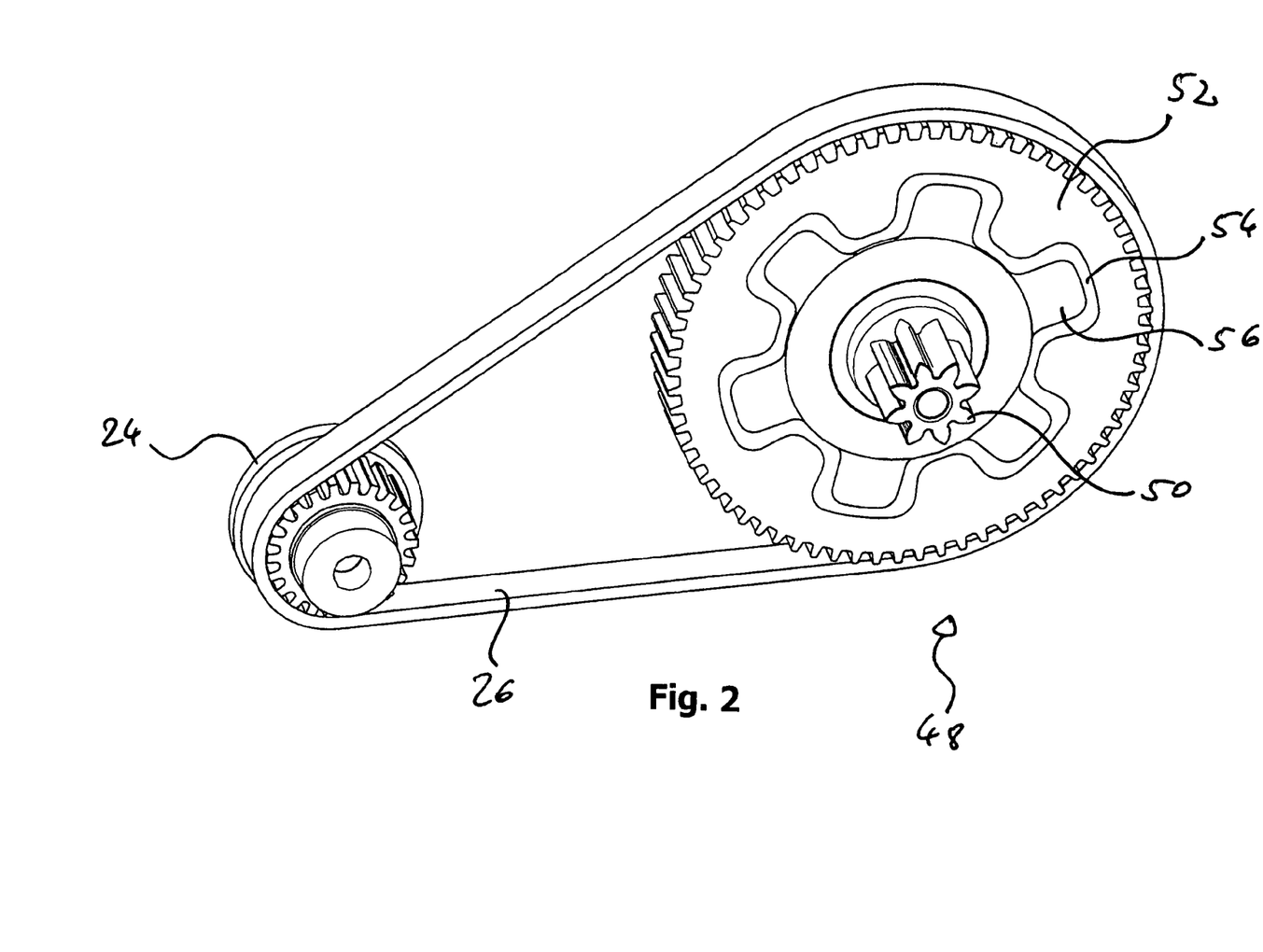
FIG. 2 shows a perspective representation of a belt gear mechanism of the brake actuator according to FIG. 1.

FIG. 2 shows a perspective representation of a toothed belt gear mechanism 48 comprising the toothed belt pulleys 24 and 28 and the toothed belt 26. A sun wheel 50, which is connected to the toothed belt pulley 28 in a rotationally rigid manner, of a first stage of the planetary gear mechanism 34 can clearly be seen. The toothed belt pulley 28 comprises a ring gear 52, a bushing, concentric with the axis of rotation of the toothed belt pulley 28, of vibration-damping elastomer material 54 and a hub 56 with the sun wheel 50. In the represented design the ring gear 52 has six meandering protuberances (or fillings) on the inside, which are adjoined positively and in a torque-transmitting manner by the vibration-damping material 54 of a substantially constant thickness. Corresponding meandering indentations are located at the outer circumference of the hub 56, so that a torque-tight connection between the ring gear 52 and the hub 56 is obtained overall. The material PBT-GF30 has proved successful for the hub 56 in practice.

Figure 3:
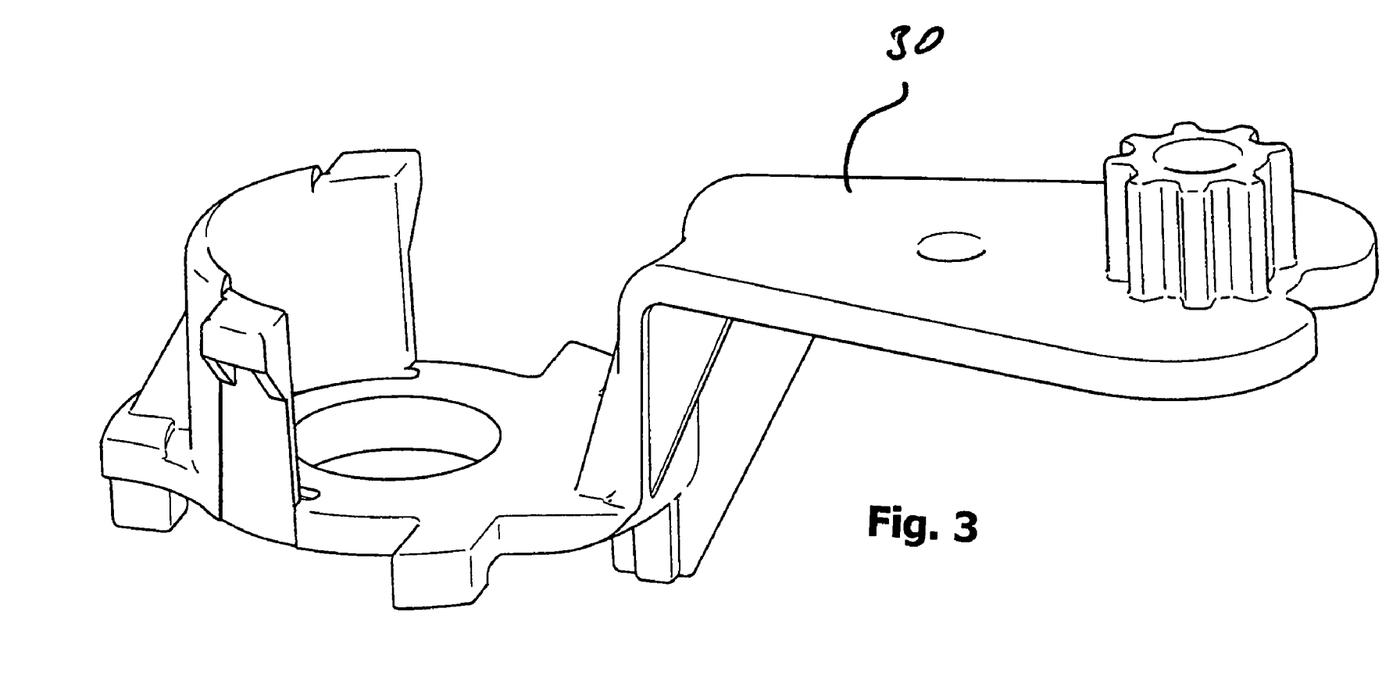
FIG. 3 shows a perspective representation of an internal gear of a planetary gear mechanism of the brake actuator according to FIG. 1.

FIG. 3 shows a perspective representation of the spacer 30 which is shown mounted between the electric motor 20 and the planetary gear mechanism 34 in FIG. 1. The side of the spacer which is on the left in FIG. 3 is non-positively connected to the electric motor 20. On the side which is on the right in FIG. 3 it can clearly be seen that the outer circumference of the holder for the shaft 32 is designed as a multi-wedge profile with eight wedges. The spacer 30 is made of a rigid material such as, for example, hard plastics material or metal.

Figure 4:
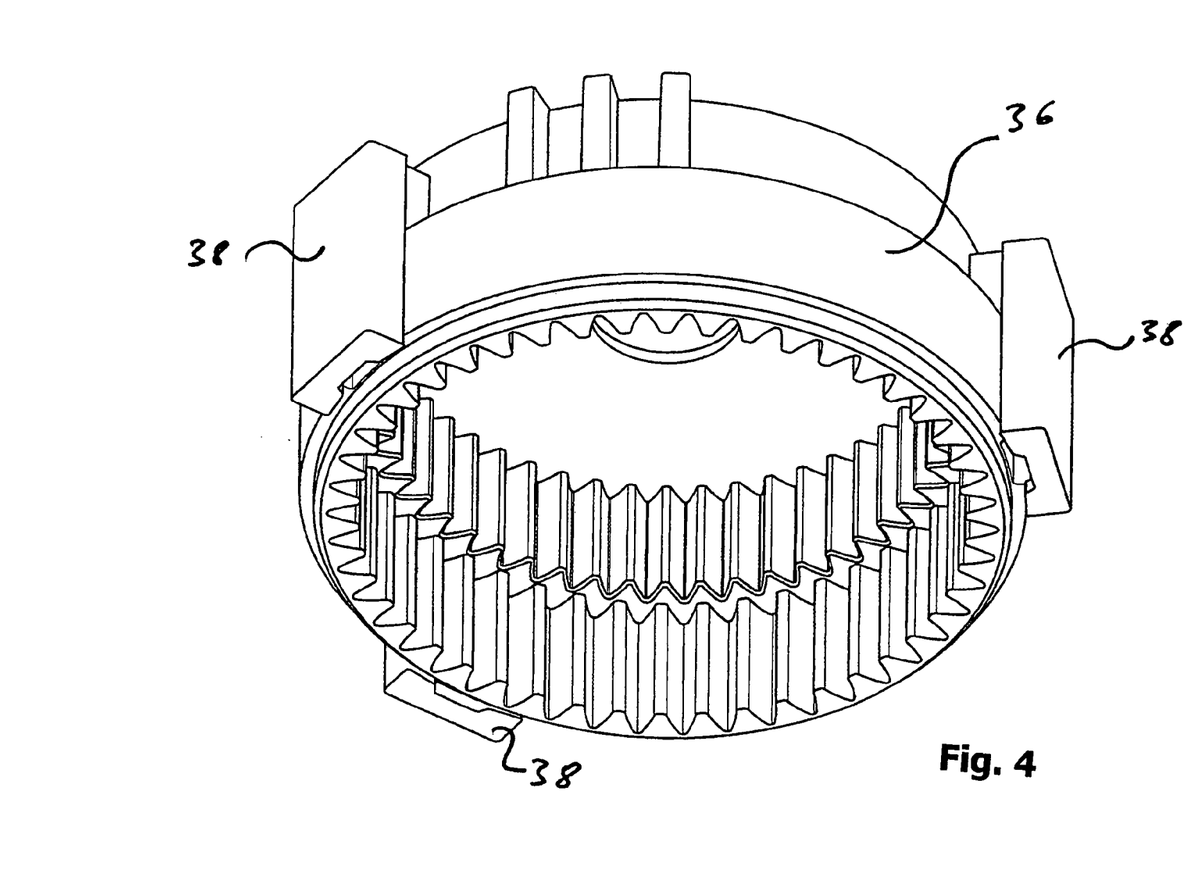
FIG. 4 shows a perspective representation of a spacer of the brake actuator according to FIG. 1.

FIG. 4 shows the internal gear 36 with the elements 38 fastened thereto and consisting of a vibration-damping material. It has proved advantageous to make the elements 38 from EPDM (ethylene-propylene-diene rubber). In the fitted state the internal gear 36 is supported at the housing body 14 via the elements 38. The two internal tooth systems of the internal gear for the two gear stages of the planetary gear mechanism 34 can clearly be seen. The tooth system which is at the bottom in FIG. 4 is disposed along a somewhat smaller circumference of a circle than the top one, thus ensuring that the planetary gear mechanism can be assembled.

Figure 5:
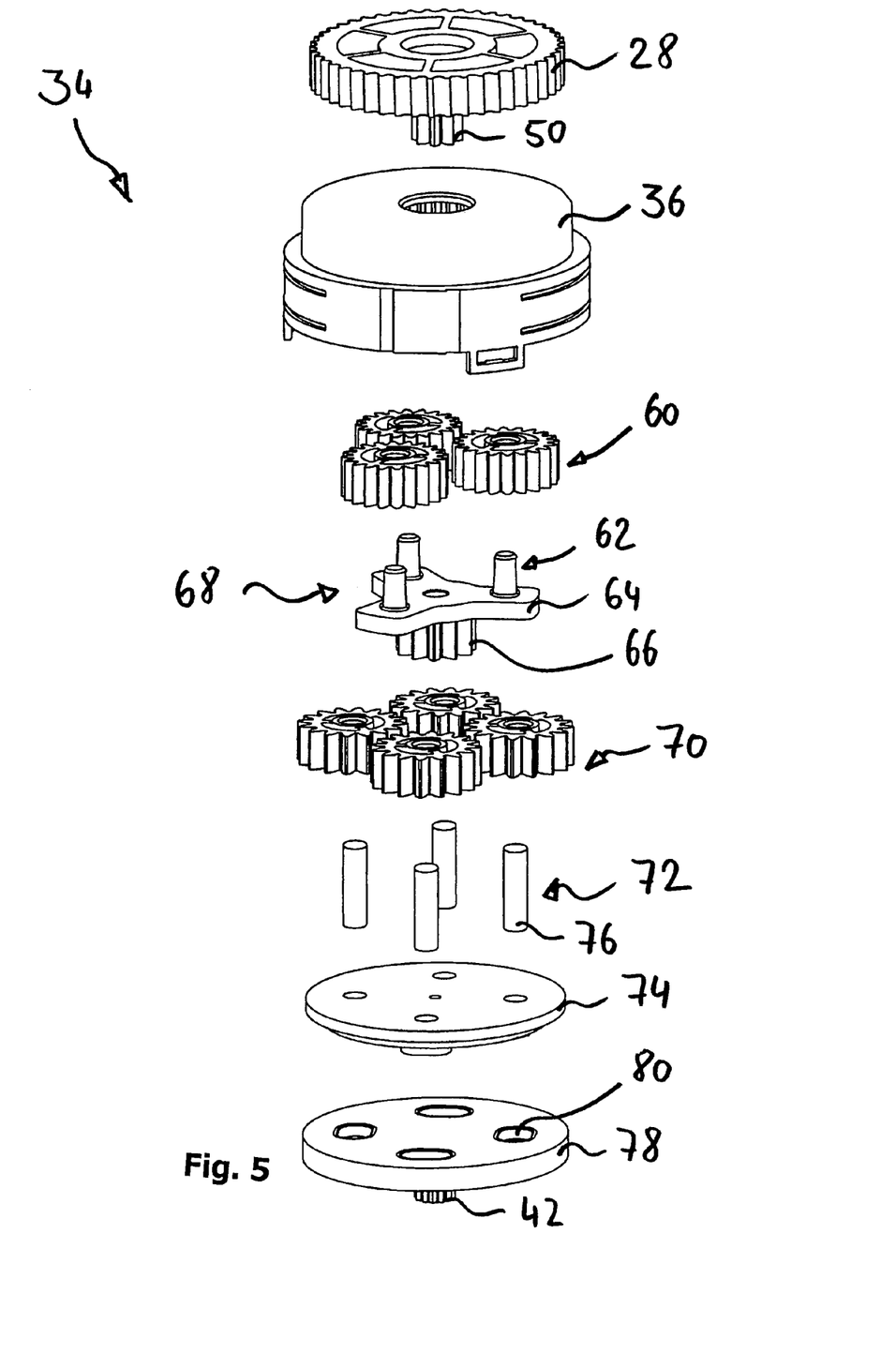
FIG. 5 shows an exploded drawing of the planetary gear mechanism of the brake actuator according to FIG. 1.

FIG. 5 shows an exploded representation of the structure of the planetary gear mechanism 34. In this representation the second pulley 28 is shown at the very top, the sun wheel 50 of which pulley enters the internal gear 36 following assembly. Three planet wheels 60 run inside the internal gear 36 between the sun wheel 50 and the internal gear 36. The shafts 62 of the three planet wheels 60 are fastened in a torque-transmitting manner to a first planet carrier 64, which bears a second sun wheel 66 on its side which lies opposite the planet wheels 60. In the represented design the shafts 62, the planet carrier 64 and the sun wheel 66 form a single component 68.

Four further planet wheels 70 are disposed between the second sun wheel 66 and the internal gear 36. The four planet wheels 70 run on four pin-shaped shafts 72, which are fastened to an additional planet carrier 74. The four shafts 72 extend through associated bores in the planet carrier 74 such that shaft sections 76 project on the side of the carrier 74 which is at the bottom in FIG. 5. The torque can be transmitted to a downstream gear component 78 by means of the projecting shaft sections 76 or separate means.

The shaft sections 76 passing through the carrier 74 can be formed as extensions of the shafts 72, so that a pin section 76 and a shaft 72 in each case form an integrated component. When forming the planet carrier 74 as a plastics part, the sections 76 and the shafts 72 can be moulded on separately, for instance by using a two-component injection moulding process.

In the represented embodiment the two sun wheels 50, 66 have different pitches, which correspond with those of the respective planet wheels 60, 70. Two ring gears with different pitches are likewise formed in the internal gear 36.

Figure 6:
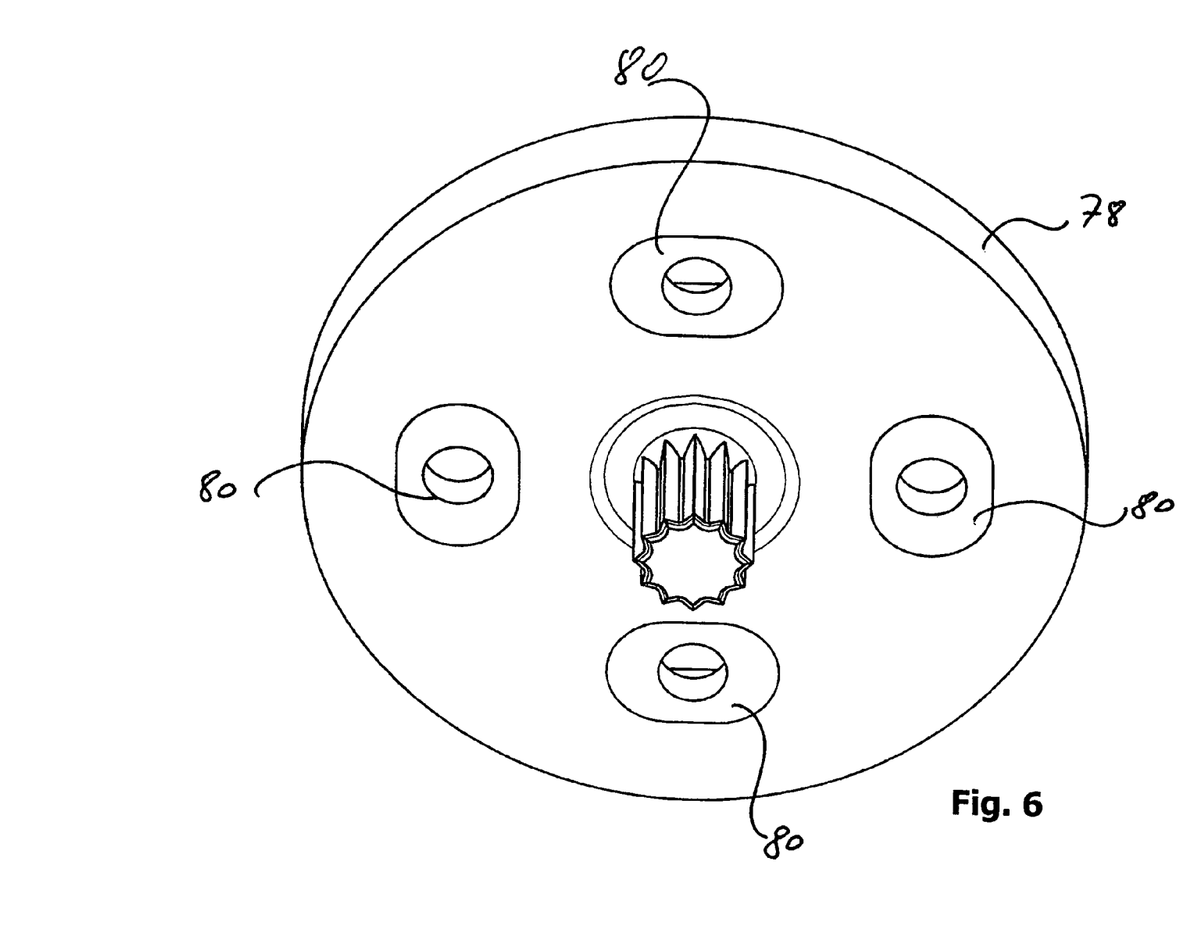
FIG. 6 shows a perspective representation of a carrier plate with output pin of the brake actuator according to FIG. 1.

FIG. 6 shows a perspective representation of the gear component 78 of the planetary gear mechanism 34 which is on the output side with the profiled pin 42 for torque transmission as well as with linings 80 consisting of a vibration-damping material in the recesses provided for them in the component 78. In the embodiment which is shown here the recesses and the linings 80 are substantially radially symmetrical. The gear component 78 is mounted at the output of the planetary gear mechanism 34 so that the shaft sections 76 (not represented) which are guided along a circular path through the output of the planetary gear mechanism 34 engage in the designated holders of the vibration-damping elements 80 and thus transmit the torque to the component 78. The elements 80 can be vulcanised onto the component 78, for example, or produced separately and subsequently mounted.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

The invention claimed is:

1. Electrically driven brake actuator, comprising an electric motor for producing a torque, a device for torque transmission and an element for torque delivery, wherein the electric motor has a motor shaft and the device for torque transmission has a gear mechanism with a gear shaft which is parallel to the motor shaft, wherein the torque is transmitted from the electric motor to the gear mechanism by means of a belt drive and the distance between the motor shaft and the gear shaft is fixed by means of a rigid spacer having two ends, and wherein a first end of the spacer, which is connected to the electric motor, and a second end of the spacer, which is connected to the gear mechanism, are located on different sides of a plane which is defined by a belt of the belt drive and wherein the spacer extends through the belt.

2. Brake actuator according to claim 1, wherein the actuator comprises an actuator housing and a vibration-damping element, wherein at least one component of the actuator is supported at the actuator housing by means of the vibration-damping element.

3. Brake actuator according to claim 2, wherein the gear mechanism is supported at the actuator housing by means of the at least one vibration-damping element.

4. Brake actuator according to claim 3, wherein the gear mechanism is a planetary gear mechanism with at least one internal gear, wherein the at least one internal gear is supported at the actuator housing by means of the at least one vibration-damping element.

5. Brake actuator according to claim 2, wherein the electric motor is supported at the actuator housing by means of the at least one vibration-damping element.

6. Brake actuator according to claim 2, wherein the spacer is supported at the actuator housing by means of the at least one vibration-damping element.

7. Brake actuator according to claim 6, wherein the spacer and the at least one vibration-damping element are firmly connected together and form an individual component which can be handled separately.

8. Brake actuator according to claim 2, wherein the vibration-damping element is an elastomer element.

9. Brake actuator according to claim 1, wherein the electric motor has at least one of the following features: a number of poles of more than 5; a finely balanced armature; glued flux sheet; damped brushes.

10. Brake actuator according to claim 1, wherein the spacer is formed with a bearing holding a shaft at least on one side.

11. Brake actuator according to claim 1, wherein the spacer is of S- or Z-shaped formation.

12. Brake actuator according to claim 1, wherein the spacer has formations on one side for connection to a housing of the electric motor.

13. A motor vehicle brake system with an electrically driven brake actuator according to claim 1.

14. Brake system according to claim 13, wherein the electrically driven brake actuator is associated with a service brake and/or a hand brake.

* * * * *